May 4, 1965 R. B. DEAN 3,181,501

MACHINE FOR APPLICATION OF HOT MELT ADHESIVE

Filed Sept. 28, 1961

INVENTOR
ROBERT B. DEAN
BY
ROBERT CALVERT
ATTORNEY.

United States Patent Office 3,181,501
Patented May 4, 1965

3,181,501
MACHINE FOR APPLICATION OF HOT
MELT ADHESIVE
Robert Berridge Dean, Bainbridge, N.Y., assignor to The
Borden Company, New York, N.Y., a corporation of
New Jersey
Filed Sept. 28, 1961, Ser. No. 141,467
1 Claim. (Cl. 118—70)

This invention relates to a machine for melting an adhesive and delivering it to a surface to be bonded thereby.

The invention is useful for many bonding operations, as in assembling bags, boxes and other packages and compositing shoe welts and soles.

Hot melt adhesive compositions used for such articles are adversely affected by being kept in melted condition for a substantial period of time. To avoid this difficulty, the adhesive of this type has been supplied heretofore as a coiled rope or rod and unrolled for melting as needed. The winding and the unwinding of the rope, without rupture, requires that the adhesive when cold be relatively flexible and resistant to stress cracking. These requirements severely limit the number of potentially useful polymers having properties that might be permissible in the adhesive. There are many uses, however, for more rigid adhesives. The reeling and unreeling of the adhesive require also special equipment which, in certain installations, is either not available or inconvenient to use. The rolled and packaged forms of the adhesive, furthermore, are generally bulky in shipment and storage. Finally, use of rolls of rope necessitate substitution of a new roll of the adhesive at the exact time of the exhaustion of the first roll, for uninterrupted delivery of the adhesive from the applicator machine.

The present invention provides the advantages of the rope form of adhesive without the disadvantages thereof. It comprises the herein described machine in which severed slugs of the adhesive composition that may be shipped in bulk in random arrangement are unscrambled, oriented in end to end relationship, crowded together and forced into and out of the melting and applicator parts of the machine.

Figure 3:
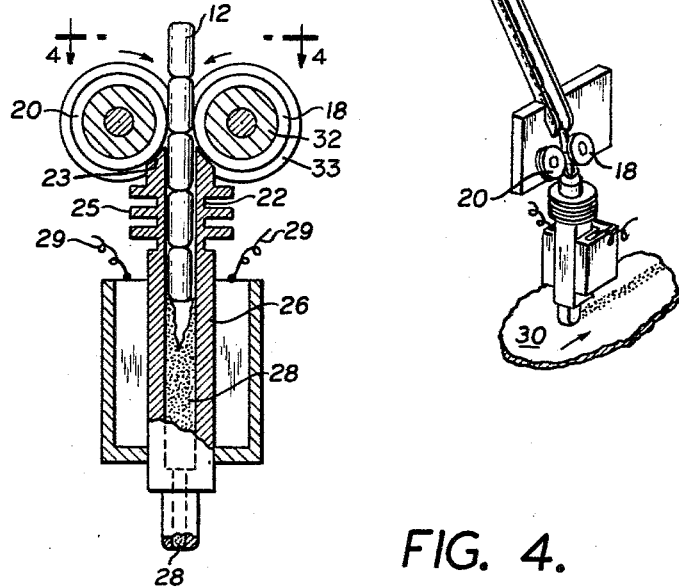
FIG. 3 is an enlarged side view, partly in section, of the critical features of the machine of FIG. 1.

There is shown an unscrambler 10 of conventional kind for receiving the slugs 12 and 14 of adhesive in random arrangement, orienting them, and delivering them end to end down a chute 16 or 17. At the lower end of the chute 16 of FIG. 1, the slugs feed by gravity between the crowding or driving rollers 18 and 20 spaced apart at a distance slightly less than the shortest transverse dimension of the slugs, so that the rollers grip the slugs and force them downwardly, as shown in FIG. 3. The guide 22 is integral with and an extension of the melting chamber 26. The guide has tapered upper edges 23 fitting in recesses or grooves 24 inside of the said rollers, so as to facilitate removal of the slugs 12 from the rollers. The fins 25 on the guide promote cooling of the guide by the air therearound, so as to decrease the upward transfer or heat and preserve the firmness of slugs 12 between the pushing rollers 18 and 20 and prevent stickiness and adherence to the rollers.

At its lower part the guide is continuous with the electrically heated chamber 26, with wires 29 for the current. The melted adhesive 28 is forced by the slugs thereabove through the tubular space defined by the inner wall of the melting chamber and through the outlet 28, e.g., as a strip onto the surface 30 to be adhered.

Figure 4:
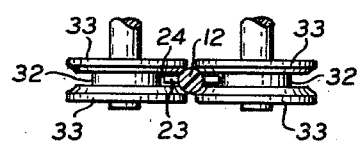
FIG. 4 is a plan view on line 4—4 of FIG. 3 in the direction of the arrows.

The fitting of the tapered end 23 of the guide is shown in greater detail in FIG. 4. This end fits into the grooves or recesses in the rollers 18 and 20, so that the edges of the tapered end extend between the recessed central part 32 of the face of the rollers and the slug 12, the slug being engaged first by the peripheral or flanged portions 33 of the said faces but being easily parted therefrom by the said tapered end.

The crowding and pushing rollers advantageously have milled faces, as illustrated, and suitably are shaped on their faces to conform in general to the contour of the slugs passing thereunder.

Materials of construction used in the various parts are those that are commonly employed in like parts of similar machines. Thus the electrical heating elements may be Nichrome. The packing is a resiliently yieldable plastic ring such as one of Teflon (tetrafluoroethylene). The rest of the machines shown may be stainless steel, steel, iron, aluminum, and/or brass, for example, a strong metal being used for parts subjected to substantial stress.

Dimensions are selected to deliver the amount of adhesive required for a given size and speed of operation. The slugs of adhesive, for instance, may be and suitably are of diameter or distance across 0.2 to 1 inch and of length not more than about 10 times the said diameter or longest transverse measurement. Thus a representative generally cylindrical slug will be about 0.5 inch in diameter and 2-4 inches long and shorter than the distance between the feed rollers 18 and 20 and the entrance to the melting chamber 26, as illustrated in FIG. 3.

The operation of the mechanism described will be largely evident from the description given.

The electric current is introduced through the leads 29 in amperage to raise the temperature within the melting chamber to the point of melting of the material of the slugs or other shapes of the adhesive within the heating chamber into a viscous integral mass that is flowable under the pressure thereupon.

The unscrambler used in orienting the slugs 12 and 14 is activated by a vibrator of type which is usual for upgrade movement of material.

The cooling fins 25 cause the slugs 12 to remain substantially nonadherent to the rollers 18 and 20 and to push each other in solid form into the melting chamber therebelow and eventually to expel the melted adhesive from the outlet 28 onto the object 30 to be adhered, the object being, for example, shoe welt or a paper or cardboard supported and moved directly below the outlet in any convenient manner. The restricted outlet from the chamber and the viscous, difficulty flowable nature of the melted adhesive cause the melting chamber to be closed to the extent that the adhesive composition therein is under pressure from the piston or plunger, the pressure promoting consolidation and integration of the molten adhesive from the several individual slugs or sources thereof.

Once the adhesive has been applied to the surface to be bonded, the subsequent bonding, as in making a seam in a paper bag or in applying a shoe welt between leather sole blanks, is effected in machinery, at temperatures, and under conditions that are conventional in the use of adhesives applied by the standard adhesive rope technique.

The adhesive used is one of the hot melt class. It may be sufficiently soft and pliable for uses requiring softness or pliability or, on the other hand, firm and substantially unbendable without fracture at ordinary temperatures. Examples of adhesives that meet the requirements are illustrated in the specific examples that follow.

In these examples and elsewhere herein proportions are expressed as parts by weight.

Example 1

Figure 1:
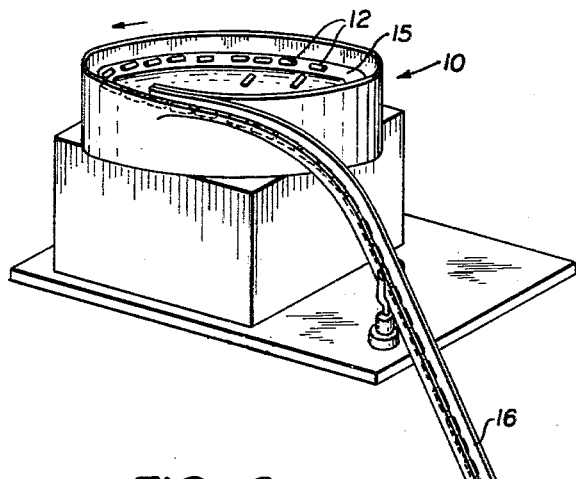
FIG. 1 is a perspective view of the machine of the invention.
Figure 2:
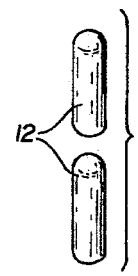
FIG. 2 is a perspective view of slugs of adhesive suitable for use in the machine.

A thermoplastic, i.e., fusible, adhesive composition adapted for hot extrusion into a solid rod and then for being chopped when cold into slugs for use in a machine such as illustrated particularly in FIGS. 1 and 3–4 is compounded as follows:

A suitable mixer, e.g., a simga blade or Banbury mixer, is heated to 135°–150° C. Then 33 parts of polyterpene beta-pinene polymer resin (Piccolyte 100) of melting point 100°–120° C. are introduced into the mixer, agitation initiated and the polyterpene thus melted. Then 11 parts of polybutene of content of unsaturates less than 0.5% are admixed and the two materials are blended with each other. The temperature is then raised to 165° C. and an antioxidant 4,4-thio-bis(6-tert-butyl-m-cresol) and polyethylene are admixed, in alternating additions, and in total amounts to provide 55 parts of the polyethylene and 1 part of the antioxidant. The polyethylene used is any grade of molecular weight below 10,000, as in the range 2,000 to 10,000.

The whole is melted at 150°–165° C. and stirred until it is compounded substantially uniformly. It is then poured into the jacketed feed hopper of an extruder and in turn is extruded and formed into a rod, by usual machinery and technique, the diameter of the rod being made about 0.25 inch. This extruded rod is chopped into elongated slugs of length about 0.75 inch. Such slugs, in passing the various turns and operations, described in the operation of the said machines, are not subject to cracking in any stage of the operation. The rope from which the slugs were cut, on the other hand, if reeled and unwound cold as in the usual practice of using the hot melt adhesive ropes, would undergo cracking into fragments of irregular and undetermined length.

The slugs so made are delivered, as down the chute 16, to the operations described. They do not adhere objectionably to any of the wheels. There are no voids in the molten adhesive issuing from the outlets from the melting chamber that, if occurring, would suggest discontinuity of the adhesive masses from the several slugs.

Example 2

A fusible but long-flow thermosetting resin composition sufficiently firm for use under a great variety of conditions in adhering surfaces together and yet not subject to rupture in being delivered and processed is made of the following composition.

| Component: | Parts by weight |
|---|---|
| Natural phenol (87% $C_6H_5OH$) | 100 |
| Formaldehyde as 37% solution | 55 |
| Sulfuric acid, conc. | 1 |

This mixture is heated to refluxing and maintained at that temperature until separation occurs into a resinous and an aqueous layer. The aqueous layer is then removed by distillation under vacuum, as at 10 mm. of pressure. Into the remaining condensate of the phenol with formaldehyde there are mixed 25 parts of linseed oil. The resulting mixture is heated to 150° C. and the oil in the composition is cooked at this temperature until the resulting resin becomes substantially clear. The product is then dropped into a receiving pan, cooled in air and ground to pass through a 100 mesh screen. To the powder thus made there are admixed ground hexamethylene tetraamine as curing agent in the proportion of 6 parts to 100 parts of the powder. The whole is then pressed into shape desired, as into tablets of ½ inch diameter for use in the machine illustrated.

When the thermosetting adhesive of this example has been applied to one at least of the surfaces to be bonded, the surfaces are then plied together with the adhesive therebetween, and heated to the temperature of curing the resin, as to about 300°–350° F. for the necessary time, usually a few minutes, to cure the resin.

It will be understood that it is intended to cover all changes and modifications of the examples of the invention herein chosen for the purpose of illustration which do not constitute departures from the spirit and scope of the invention.

I claim:

A machine for applying hot melt adhesive to a surface to be bonded thereby, the machine comprising means for delivering, between coacting feeding rollers, shaped discontinuous generally cylindrical masses of a solid fusible adhesive composition, the rollers being spaced apart at their faces at a distance to receive and press upon said masses, a melting chamber, guides extending continuously from the outlet between the rollers through said chamber for guiding and confining the adhesive after passage between said rollers and through the melting chamber, means for maintaining said chamber at a temperature above melting of the adhesive composition, an outlet from the melting chamber for delivery of the fluid adhesive composition to the surface to be bonded, and means for rotating said rollers so as to maintain a forward pressure on the said masses delivered thereto and on the molten adhesive up to and including the time of delivery of the adhesive from said outlet, said rollers having circular faces for contacting the said masses, the faces being provided with annular grooves, and the said guide having tapered ends extending into and fitting within the grooves, so that the tapered ends remove the masses of adhesive after passage between the said rollers, from the faces thereof.

References Cited by the Examiner

UNITED STATES PATENTS

| 672,433 | 4/01 | Arnaman et al. | 113—107 |
| 1,412,227 | 4/22 | Anderson et al. | 221—233 X |
| 2,043,188 | 6/36 | Walten | 118—302 X |
| 2,266,044 | 12/41 | Irving et al. | 23—252 |
| 2,477,258 | 7/49 | MacMillin. | |
| 2,742,142 | 4/56 | Paulsen | 118—302 X |
| 2,965,066 | 12/60 | Paulsen | 118—259 X |
| 2,970,591 | 2/61 | Paulsen | 118—410 X |
| 3,001,234 | 9/61 | Renier | 18—30 |
| 3,003,189 | 10/61 | Slayton et al. | |

FOREIGN PATENTS

| 431,537 | 7/26 | Germany. |
| 744,884 | 2/56 | Great Britain. |
| 1,243,802 | 9/60 | France. |

RICHARD D. NEVIUS, *Primary Examiner.*

JOSEPH B. SPENCER, *Examiner.*